United States Patent

Yasukuni et al.

4,193,667

Mar. 18, 1980

[54] ZOOM LENS SYSTEM CAPABLE OF CONSTANT MAGNIFICATION PHOTOGRAPHY

[75] Inventors: Mitsuo Yasukuni, Sakai; Toshinobu Ogura, Tondabayashi; Takanobu Omaki, Sennan; Masahide Tanaka, Toyonaka, all of Japan

[73] Assignee: Minolta Camera Kabushiki Kaisha, Osaka, Japan

[21] Appl. No.: 937,276

[22] Filed: Aug. 28, 1978

[30] Foreign Application Priority Data

Sep. 1, 1977 [JP] Japan .................. 52-105764

[51] Int. Cl.² ..................... G02B 15/17; G02B 7/10
[52] U.S. Cl. .......................... 350/187; 352/85
[58] Field of Search ............... 350/187; 354/25, 195, 354/197; 355/58, 59; 352/85

[56] References Cited

U.S. PATENT DOCUMENTS

4,083,057  4/1978  Quinn ........................ 350/187

*Primary Examiner*—Jon W. Henry
*Attorney, Agent, or Firm*—Jackson, Jones & Price

[57] ABSTRACT

A constant magnification zoom lens system is provided that has the capability of permitting a predetermined desired constant magnification of an image during a zoom operation. A variator lens group for varying the focal length of the lens system and a compensator lens group for controlling the position of an image formed by the lens system is provided. Pairs of cam and follower assemblies can be provided in the barrel mechanism to control the movement of the respective compensator lens group and variator lens group so that the position of an image of a fixed object is maintained within a predetermined depth of focus in a normal zooming mode of operation and also the position of an image of a moving object can be maintained within a predetermined depth of focus in response to any variation of focal length to provide a constant magnification photography mode.

8 Claims, 15 Drawing Figures

ZOOM LENS SYSTEM CAPABLE OF CONSTANT MAGNIFICATION PHOTOGRAPHY

BACKGROUND OF THE INVENTION

1. Field of the Invention

The present invention generally relates to a zoom lens system, and more particularly to a zoom lens system capable of maintaining a given magnification during a change in the photographing distance of an object on which the lens system is focused. The capability of this form of zoom lens system is especially useful in a motion picture or television camera when shooting an object which is gradually approaching or receding.

2. Description of the Prior Art

When an object to be photographed moves along the optical axis, constant magnification photography may be achieved by adjusting the focus of the lens system in response to the change in the object distance and also by adjusting the focal length to correct for the change in magnification due to the change in the object distance. In the prior art, it is known to connect the zooming means to the focusing means in a predetermined manner so that a zooming operation, to off-set the change in magnification, may also automatically accompany the focusing operation to focus the system on the moving object. However, the manner in which the zooming means is connected to the focusing means must be pre-determined with respect to a specific magnification. The particular structural arrangement, accordingly, has to be altered if a constant magnification photography at another magnification is desired.

U.S. Pat. No. 4,083,057 discloses a constant magnification photography lens system, wherein changes in the position of the taking lens are accompanied by changes in the zoom focus system. Swiss Pat. No. 481,389 is also cited of interest.

The prior art is still seeking a constant magnification zoom lens system that is relatively inexpensive.

SUMMARY OF THE INVENTION

An object of the present invention is to provide a zoom lens system capable of providing constant magnification photography in a simplified manner.

Another object of the present invention is to provide a constant magnification photography lens system having a variable selectability of the desired constant magnification in a simplified manner.

Further object of the present invention is to provide a lens system which is easily changeable between a normal zooming mode of operation and a constant magnification photography mode of operation.

According to the present invention, the focusing assembly is not connected to the zooming assembly but is independent during the focusing operation in the constant magnification photography mode. The zoom lens system according to the present invention includes a conventional variator lens group and a conventional compensator lens group. However, the compensator lens group is adapted to be given a particular axial movement other than the conventional movement for the purpose of the focusing operation in the constant magnification photography mode. The independent focusing assembly is capable of being utilized for a magnification setting operation during the constant magnification photography mode.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 1-a, 1-b and 1-c represent schematic views of an embodiment of the present invention in various positions, respectively, in which lens groups are symbolically shown;

FIGS. 3-a and 3-b represent respectively, a half cross-sectional view of a detailed embodiment of the present invention, and an expanded view of a fixed barrel of this embodiment provided with cam slots;

FIGS. 5-a, 5-b and 5-c represent a half cross-sectional view of another detailed embodiment of the present invention; and expanded view of a fixed barrel of this embodiment provided with cam slots and an expanded view of a slidable pipe of this embodiment provided with a cam slot, respectively;

FIG. 6-a represents a half cross-sectional view of still another detailed embodiment of the present invention, accompanied with FIGS. 6-b and 6-c which represent expanded views of a fixed barrel of this embodiment provided with cam slots with the relative position of control grooves shown in a normal zooming mode and a constant magnification photography mode, respectively, and FIGS. 7-a and 7-b represent expanded views of a fixed barrel of a modification of the FIG. 6-a embodiment provided with cam slot with the relative position of a control groove shown in a normal zooming mode and a constant magnification photography mode, respectively.

DETAILED DESCRIPTION OF THE PREFERRED EMBODIMENTS

The following description is provided to enable any person skilled in the optical art to make and use the invention and sets forth the best modes contemplated by the inventors of carrying out their invention. Various modifications, however, will remain readily apparent to those skilled in the art since the generic principles of the present invention have been defined herein specifically to provide a constant magnification zoom system that can be manufactured in a relatively economical manner.

In one mode of the present invention, an optical lens system is capable of changing the object distance value of a zoom lens system to keep the objects being photographed in focus while simultaneously changing the focal length value of the zoome lens to maintain a selected prescribed fixed ratio between the object distance quantity and the focal length quantity in order to keep the image size substantially constant. This selected ratio between the object distance value of the lens system and the focal length value of the lens system is designed to maintain the selected constant image size while the focal length value is changed to keep the object in focus when the distance between the object and the lens is changing or changes. By maintaining this ratio at a constant value, the image size can be kept at a constant value.

Because both the distance and the focal length can vary the image size, it has been found that maintaining a constant image size manually is unfeasible since it requires simultaneously varying both the object distance to focus and the focal length to zoom when the distance between the photographic object and the lens system is changing.

Figure 1A:
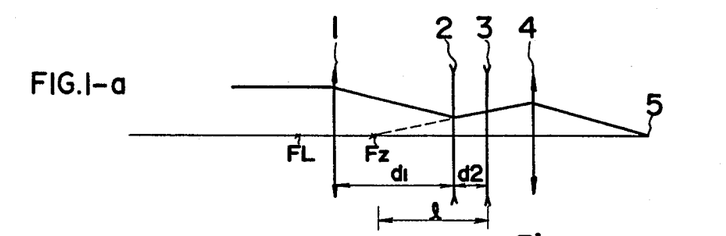
Figure 1B:
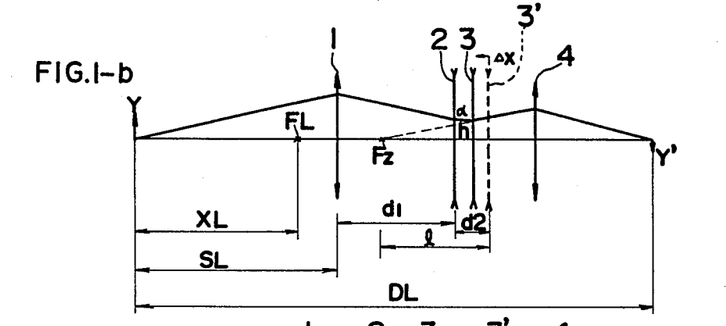
Figure 1C:
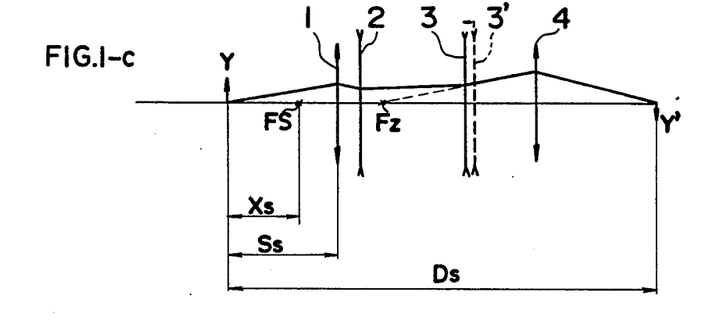

Referring to FIGS. 1-a, 1-b and 1-c, the manner in which the zooming and focusing mode of operation of the zoom lens system of the present invention is disclosed in a schematic form. FIG. 1-a discloses the position of each lens group when the system is focused on infinity with the focal length of the lens system set at the longest focal length FL. For purposes of simplicity, each of the respective lens groups that constitute the zoom lens system are shown in a simplified format so that the focusing lens group (1), the variator lens group (2), the compensator lens group (3), and the master lens group (4), are only schematically presented. The reference symbol FL, represents an object focal point of the lens system when the zoom lens system is set at the longest focal length FL. Reference symbol Fz represents a zoom focal point.

FIG. 1-b discloses the position of each lens group when a lens system is focused on a close object by movement of only the compensator lens group (3) from the broken line position indicated by reference numeral (3) to the solid line position indicated by the reference numeral (3). The focusing lens group (1) has remained stationary. An object Y to be focused in indicated at a distance XL from the object focal point FL. While the focal length of the zoom lens system can be changed by the movement of the compensator lens group (3), the focal length of the system, however, is considered to be FL even in the case of FIG. 1-b since the change in the focal length is of such a small magnitude that it can be disregarded.

FIG. 1-c discloses the positions of each lens group when the object Y has moved closer to the lens system. The focusing is performed by a further movement of the compensator lens group with the zooming operation carried out so that the image magnification is the same as the case of FIG. 1-b. In FIG. 1-c, the broken-lined position indicated by reference numeral (3') of the compensator lens group represents a position according to a normal zooming operation and the solid-lined position indicated by reference numeral (3) represents the position of the compensator lens group after further movement from the position (3') for the purpose of focusing. In the condition of FIG. 1-c the focal length of the system is Fs since the variator lens group (2) is shifted. The object focal point of the system is represented by Fs and the distance between Fs and object Y is represented by Xs in FIG. 1-c. Reference symbol DL in FIG. 1-b and reference symbol Ds in FIG. 1-c represent photographing distances in the cases of the focal lengths FL and Fs respectively. Reference symbols SL and Ss further represent object distances from focusing lens group (1).

The following formula should be satisfied in order for each magnification, in case of both FIG. 1-b and FIG. 1-c, to be of the same value M:

$$FL/XL = Fs/Xs = M \tag{1}$$

As is obvious from the above formula (1), the relationship between distance X from the object focal point F to object Y; focal length f of the zoom lens system; and magnification M, is generally expressed as follows:

$$f/X = M \tag{2}$$

Figure 2:
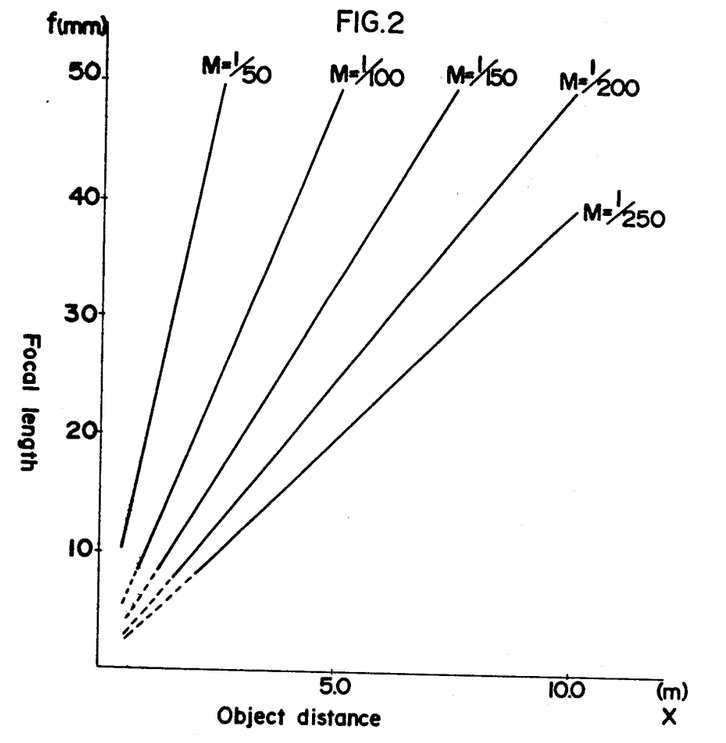
FIG. 2 represents a graphical plot showing relationships of the focal length of the system to the photographing object distance for maintaining predetermined magnifications.

Formula (2) shows that the magnification M is given as a function of the distance X between the object focal point F and the object Y and the focal length f of the zoom lens system. Formula (2) shows that the relationship between X and f is a linear function with the magnification M considered to be the constant. In FIG. 2, the relationship between f and X with M as a parameter is shown in accordance with Formula (2) with respect to a zoom lens system of a focal length, f, variable between 4.5 mm and 7.5 mm. The range of X is from 1 m to 10 m.

Accordingly, with reference to Formula (2) and FIG. 2, constant magnification photography permitting a change in the object distance is practicable when the setting of the focal length, in response to zooming operation and the object distance, in response to focusing, is performed in accordance with the relationship shown in FIG. 2.

A description of the principle of focusing by means of compensator lens group (3) is as follows. Referring to FIG. 1-a, the object distance is infinite and the image point is on focal plane (5). In order for the image point to be at the same position as in FIG. 1-a even when object Y moves from the position in FIG. 1-a to a position with finite distance XL from object focal point FL, the compensator lens group 3 must have to be moved by $\Delta x$ to satisfy the following formula;

$$a\phi_3 \Delta x^2 - \{h - a(d_2 + l)\}\phi_3 \Delta x - \{h - a(d_2 - l) + l(-h - ad_2)\phi_3\} = 0 \tag{3}$$

In the above Formula (3), $$a = -1/s + \phi_1 + \phi_2(1 - \phi_1 \cdot d_1); \text{ and}$$

$$h = 1 - \phi_1 \cdot d_1$$

Wherein:

$\phi_1$ $\phi_2$ and $\phi_3$ represent the refractive powers of focusing lens group (1), variator lens group (2) and compensator lens group (3), respectively;

$d_1$ represents the axial distance between the focusing lens group (1) and the variator lens group (2);

$d_2$ represents the axial distance between the variator lens group (2) and the compensator lens group (3);

l represents the axial distance between the zoom focal point Fz and the compensator lens group (3) with the focal length of the system set at the longest focal length, FL; and S represents the axial distance between object Y and the focusing lens group (1).

The displacement $\Delta x$ of the compensator lens group (3) can also fulfill Formula (3) in the case of FIG. 1-c. In Formula (3), $\phi_1$, $\phi_2$, $\phi_3$ and l are predetermined irrespective of the photographing distance, while $d_1$, $d_2$ and S are given in accordance with a photographing condition to determine the value for the $\Delta x$ in question.

As is apparent from the above discussion, the principle of the constant magnification photography according to the present invention can be summarized as follows:

(1) The focal length f of the zoom lens system for maintaining a given magnification M is determined by Formula (2) with respect to the distance X.

(2) The displacement $\Delta x$ of the compensator lens group (3) for focusing the lens system on the object is determined by Formula (3) with respect to $d_1$, $d_2$ and S, in which $d_1$ and $d_2$ are given with respect to the focal length f, and S is given with respect to the distance X.

(3) The compensator lens group (3) is shifted in response to the movement of the variator lens group (2) with the displacement $\Delta x$ added, whereby the zooming operation to off-set the change in magnification due to the movement of the object is accompanied with a focusing effect on the moving object.

The following is a description of the embodiment in FIG. 1 with practical values given to the parameters in accordance with the following Table 1. Table 1 shows the case of a photographing distance D varied between 8.8 m and 1.5 m, a change of focal length in order to keep a constant magnification of 1/200, a change of $d_2$ corresponding to the above change of focal length according to a usual zooming mode of operation, and the displacement $\Delta X$ of the compensator lens group in order to focus on objects at each photographing distance D.

Table 1

| Distance from the Focal Plane to the Object D(m) | Focal length of the System f(mm) | Distance between Variator and Compensator Lens Groups $d_2$(mm) | Displacement of the Compensator Lens Group $\Delta X$(mm) |
|---|---|---|---|
| 8.8 | 44.04 | 5.68 | −0.147 |
| 7 | 35.37 | 6.45 | −0.122 |
| 5 | 24.56 | 8.88 | −0.085 |
| 4 | 20.19 | 10.73 | −0.073 |
| 3 | 14.81 | 14.35 | −0.052 |
| 2 | 9.88 | 20.34 | −0.035 |
| 1.5 | 7.73 | 24.71 | −0.029 |

In a zoom lens system with the above values given, the focal length of focusing lens group (1) is 43.424 mm, the focal length of variator lens group (2) is −13,29 mm, and the focal length of compensator lens group (3) is 8.863 mm. When the lens system is focused on infinity, the changes of the axial distances of each lens group caused by zooming are as follows:

$$d_1 = 28.108 \sim 7.158 \text{ mm}, d_2 = 5.68 \sim 24.708$$

$$d_3 = 2.695 \sim 4.616$$

Thus, the above mentioned embodiment is capable of not only a normal zooming mode of photography, but also of a constant magnification photography for a magnification 1/200 in a photographying distance range defined from 8.8 mm to 1.5 m, if a zooming operation is accompanied with a displacement $\Delta X$ of the compensator lens group within a range defined from the longest focal length to the shortest focal length with the focusing lens group left stationary at a position in which the lens system would be focused on infinity in case of a normal zooming mode. In other words, the system is focused on an object having a photograhing distance of 8.8 m at the longest focal length setting and the focused condition is automatically maintained even when the object is brought closer to the lens system, if a zooming mode of operation is practiced so as to keep the size of the object constant.

Figure 3A:
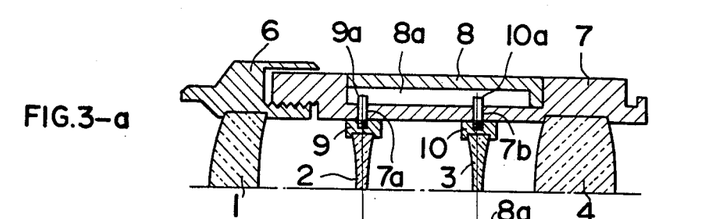
Figure 3B:
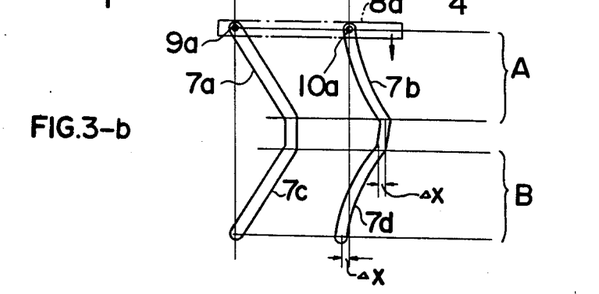

In order for the above function to be carried out, the compensator lens group, in addition to its usual movement, also requires a movement of $\Delta X$ in response to the movement of the variator lens group during the zooming operation. FIG. 3a–3b shows a schematic embodiment including structural means to realize the above movement of the compensator lens group. In FIG. 3a, reference numeral (6) represents a focusing ring to hold focusing lens group (1). Reference numeral (7) represents a fixed barrel to hold master lens group (4). Reference numeral (8) represents a zooming ring which can rotate around the fixed barrel and is provided, at the inner surface thereof with a groove (8a) extending in parallel with the optical axis. Reference numeral (9) represents a shiftable barrel for holding variator lens group (2) and is provided with guide pin (9a), which is engaged with groove (8a) through zooming cam slot (7a) of fixed barrel (7). Reference numeral (10) represents a shiftable barrel for holding compensator lens group (3) and is provided with guide pin (10a), which is engaged with groove (8a) through zooming cam slot (7b) of fixed barrel (7).

FIG. 3-b further shows the specific shapes of cam slots (7a) and (7b) with the fixed barrel laid in a flat plane. The guide pins (9a) and (10a) being at the telephoto position of the cam slot with the wide angle position being intermediate of the axial movement ranges of A and B. As can be seen in FIG. 3-b, cam slots (7a) and (7b) have respective extensions which form cam slots (7c) and (7d) which are used in a mode of constant magnification photography. The shape of cam slot (7c) is symmetrical with that of cam slot (7a). Cam slot (7d) is, however, deformed from a shape, which would be symmetrical with that of cam slot (7b), by a displacement $\Delta x$ as given in Table 1. Consequently, when groove (8a) is shifted in the direction of the arrow of FIG. 3-b in the range of A, in response to the rotation of the zooming ring, the usual mode of zooming operation from the shortest focal length to the longest focal length is performed. However, when guide pins (9a) and (10a) are guided into and moved in engagement with cam slots (7c) and (7d) within the range of B, in response to the further rotation of the zooming ring, constant magnification photography at a magnification of 1/200 is accomplished. In case of the above mentioned constant magnification photography mode, focusing ring (6) remains at a position in which the system would be focused on infinity for the case of a normal zooming mode.

When focusing lens group (1) is advanced in response to the rotation of focusing ring (6) with guide pins (9a) and (10a) set in cam grooves (7c) and (7d), an object which is closer to the lens system is brough into focus with a larger magnification. Displacement $\Delta X$ in order to perform constant magnification photography, however, is different according to the desired magnification.

The following description is provided for the case of constant magnification photography at a magnification other than the above specifiec magnification 1/200. The focused condition of a lens system is not generally maintained as an automatic response to the zooming operation. The focused condition, however, is considered to be substantially maintained when the deviation from the focused condition during the zooming operation is within the depth of focus. Thus constant magnification photography at other magnifications than 1/200 is possible by shifting the focusing lens group to a predetermined advanced position although the shape of cam slot for constant magnification photography (7d) is still determined on the basis of the magnification 1/200. The above explanation can be further understood in connection with the following embodiment.

Table 2

| Distance from The Focal Plane to the Object D(m) | Focal length of the System f(mm) | Distance between Variator and Compensator Lens Groups $d_2$(mm) | Displacement of the Compensator Lens Group $\Delta X$(mm) |
| --- | --- | --- | --- |
| 8.8 | 44.0 | 5.68 | 0.0 |
| 7 | 35.37 | 6.45 | −0.027 |
| 5 | 24.56 | 8.88 | −0.038 |
| 4 | 20.19 | 10.73 | −0.042 |
| 3 | 14.81 | 14.35 | −0.036 |
| 2 | 9.88 | 20.34 | −0.028 |
| 1.5 | 7.73 | 24.71 | −0.024 |

Table 2 is related to the second embodiment of the present invention and comprises the same optical system as the first embodiment given in connection with Table 1. In this case, however, the way to determine displacement $\Delta X$ of the compensator lens group is different from that in the first embodiment in which the focusing lens is set at the infinity focusing position. The determination of $\Delta X$, for Table 2, is based on the condition that the lens system is focused to the photographing distance 8.8 m by means of shifting the focusing lens group with the lens system set at the longest focal length without any displacement $\Delta X$ of the compensator lens group. In this case, the magnification is 1/200 and the focusing lens group is fixed. The values of displacement $\Delta X$ of the compensator lens group are given in order to focus to the respective photographing distances, while the zooming operation from the longest to the shortest focal length is performed so as to keep the image size of an approaching object constant.

Figure 4:
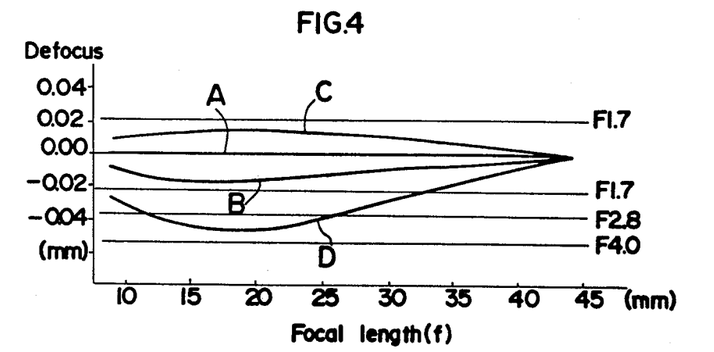
FIG. 4 represents a graphical plot showing the effect of the operation of the focusing means on a defocus condition in a constant magnification photography mode.

FIG. 4 shows the position of the image point in case of the above embodiment, wherein the focal length is marked on the horizontal axis and defocus on the vertical one. In the FIG., line (A) discloses the positon of the image point in case the focusing lens group is shifted and fixed at the position of the distance indication of 8.8 m. In this case, since displacement $\Delta X$ is determined based on this condition of the focusing lens group, constant magnificaton photography with a magnification 1/200, without defocus, is provided and an object at the object distances corresponding to the respective focal length is always in focus. Curve (B) shows the position of the image point in case the focusing lens group is shifted and fixed at the position of the distance indication of 7 m. In this case, the lens system is focused on the object at a distance of 7 meters when the system is set at the longest focal length ($\Delta X=0$), and the magnification in this condition is 1/155. When zooming towards the shortest focal length is performed, in order to keep the size of the object image constant, the defocus indicated by curve B is caused with respect to the approaching object. But the object is still substantially in focus to permit the constant magnification photography with a magnification of 1/155, since the defocus in this case is included within the depth of focus at F 1.7 as shown in FIG. 4. Curve C in the FIG. shows the position of the image point in case the focusing lens group is shifted and fixed at the position of the distance indication of 11 m to set the magnification at 1/250. The defocus in this case is also included within the depth of focus at F 1.7. Thus, constant magnification photography with any selectable magnification between 1/155 and 1/250 is practicable with respect to F 1.7 setting by means of the setting of the focusing lens group although the values of displacement $\Delta x$ are determined with respect to only the case of a magnification of 1/200. The greater the magnification difference from 1/200, the larger the extent of defocus. For example, when constant magnification photography with a magnification of 1/110 is performed with the focusing lens group fixed at the position of the distance indication of 5 m, the defocus indicated by curve D is caused. The defocus in this case, however, is still within the depth of focus to permit constant magnification photography, if the aperture is stopped-down to F 4. As is apparent from the above, it is possible to select a magnification within a wider range by means of the setting of the focusing lens group provided that photographing conditions permit the aperture size to be decreased.

Figures 5A, 5B, 5C:
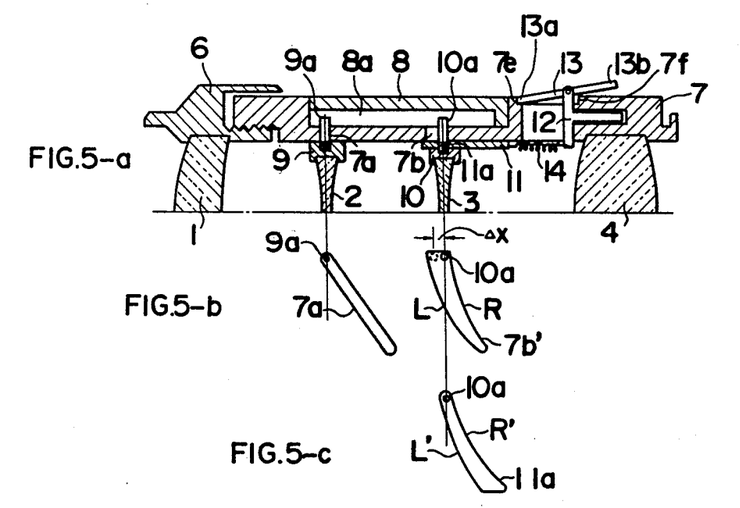

FIG. 5 shows still another schematic embodiment which includes means to provide a displacement $\Delta X$ to the compensator lens group of the present invention. This embodiment is composed with respect to the second embodiment shown in Table 2. However, it is also applicable to the first embodiment shown in Table 1. For simplicity, the parts corresponding to those of FIG. 3 are designated by the same reference numerals as of FIG. 3. The cam slot for the compensator lens group (7b') is shaped like the cam slot in FIG. 5-b which shows various cam shapes in fixed barrel (7). As shown in FIG. 5-b, cam slot (7b') is designed to be gradually relatively wider in breadth than the diameter of guide pin (10a) along the length from the lower end of cam slot (7b'). This lower end of the cam slot permits pin (10a) to set the lens system at its longest focal length with a displacement $\Delta X$ equal to zero. As a result of this construction a usual zooming mode is practicable by the movement of the guide pin (10a) along the right side cam surface (R) of cam slot (7b') while the movement of the guide pin (10a) along the left side cam surface (L) of cam slot (7b') makes it possible to give a sufficient displacement $\Delta X$ to the movement of compensator lens group (3) to perform constant magnification photography.

Reference numerals (11) to (14) are concerned with mechanical means to carry out the above movement of guide pin (10a). Reference numeral (11) represents a cylinder slidable along the optical axis while restrained from rotating around the optical axis. Cylinder (11) has a cam slot (11a), the configuration of which is shown in FIG. 5-c with cylinder (11) unrolled. Guide pin (10a) penetrates this cam slot (11a). Reference numeral (12) is a movable member which can slide in one direction parallel with the optical axis and is held fixed as shown in the Figure through the engagement of one end (13a) of a lock lever (13) withe engaged portion (7e) of a fixed barrel (7). Reference numeral (14) is a spring provided between cylinder (11) and movable member (12) and generates a biasing force by which cylinder (11) is biased to movable member (12) when it is under the conditions as illustrated in the Figure. Consequently, the left cam surface (L') of cam slot (11a) of cylinder (11) forces guide pin (10a) to move along the right cam surface (R) of cam slot (7b') to provide a normal zooming mode. Since the shape of the left cam surface (L') of cam slot (11a) is the same as that of the right cam surface (R) of cam slot (7b'), cylinder (11) will not move in the direction of the optical axis even when guide pin (10a) moves in respective cam slots (7b') and (11a).

Accordingly, the biasing force of spring (14) is constant during the movement of pin (10a).

In order to carry out constant magnification photography, the elevated end (13b) of lock lever (13) is depressed to release end (13a) from the engaged portion (7e) and the movable member (12) is permitted to shift to the left until the other end (13b) is engaged with the engaged portion (7f). As a result, spring (14) is now in a compressed state to generate an opposite biasing force which operates to repulse cylinder (11) from movable member (12). Guide pin, (10a), accordingly, is forced to move along the left cam surface (L) of cam slot (7b') by the right cam surface (R') of cam slot (11a) at cylinder (11), and constant magnification photography becomes possible. Again, cylinder (11) does not move in the direction of the optical axis and the biasing force of the spring (14) is constant, since the shape of the right cam surface (R') of cam slot (11a) is the same as that of the left cam surface (L) of cam slot (7b').

Thus, the spring itself does not further stretch nor contract and can provide a constant biasing force because the guide pin is biased movable cylinder (11) provided with cam slot (11a) whose opposite cam surfaces (L') and (R') have the same shape as the opposite cam surfaces (R) and (L) of cam slot (7b'). Further, the guide pin moves in cam slot (7b') without any disturbing chattering sound, since the guide pin is constantly pushed against a cam surface of the cam slot when guided along the cam slot.

Figure 6A:
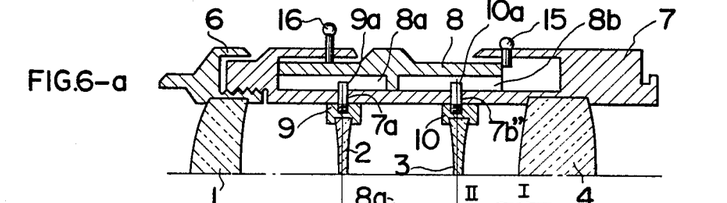
Figure 6B:
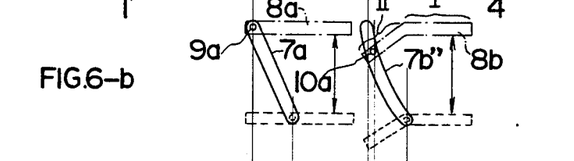
Figure 6C:
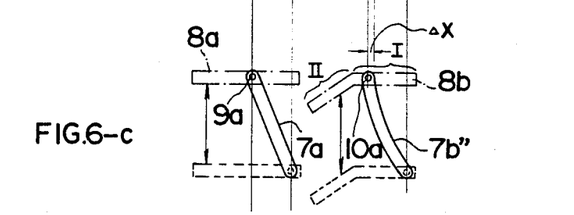

FIG. 6 shows still another schematic embodiment which includes mechanical means to produce a displacement $\Delta X$ of the compensator lens group, in accordance with the second embodiment shown in Table 2. The FIG. 6 embodiment is also applicable to the first embodiment shown in Table 1. Those parts corresponding to those of FIG. 3 are again designated by the same reference numerals as of FIG. 3. As for this embodiment, zooming ring (8) is shiftable in the direction of the optical axis as well as rotatable around the optical axis. In case of constant magnification photography, the zooming ring will have been shifted to the left and is prevented from moving in the direction of the optical axis by a lock member (15) as shown in FIG. 6-a. In the case of normal zooming photography, zooming ring (8) is shifted to the right with the lock member (15) pulled up and then a lock member (16) is pushed down with zooming ring positioned at the right end of the slidable range. Groove (8a) which is provided parallel with the optical axis will engage only with the guide pin (9a) of the shiftable barrel (9) which carries the variator lens group (2). Zooming ring (8) also includes a groove (8b) engageable with a guide pin (10a) of the shiftable barrel (10) carrying the compensator lens group (3). As is obvious in connection with FIGS. 6-b and 6-c with zoom ring (8) and fixed barrel (7) unrolled, groove (8b) includes the part (I) which is parallel with the optical axis on the same line as the groove (8a) and the bending part (II) which is continuous with the part (I).

The following is a description of the function of the above embodiment. For convenience, the case of constant magnification photography will be first explained. In this mode of operation the zooming ring (8) is situated at the left end of the shiftable rangs as shown in FIG. 6-a, and the grooves (8a), (8b) are situated as shown in FIG. 6-c. When the zooming ring is rotated under these conditions, grooves (8a), (8b) will move between the shortest focal length position indicated in the chain line and the longest focal length position indicated in the broken line in accordance with the rotation of zoom ring (8). Guide pin (10a) is constantly within the part (I) which is parallel with the optical axis in alignment with groove (8a). Consequently, guide pins (9a) and (10a) move from the respective ends of cam slots (7a) and (7b'') to the other ends with the same speed during rotation about the optical axis. According to the above operation, constant magnification photography is achieved since cam slot (7b'') is shaped to provide the displacement $\Delta x$ as shown in Table 2.

In case of a normal zooming mode, the zooming ring 8 is shifted to the right end of its shiftable range so that grooves (8a), (8b) will also move to the right as shown in FIG. 6-b. If the zooming ring is rotated under the above condition, grooves (8a), (8b) will move between the shortest focal length position indicated in the chain line and the longest focal length position indicated in the broken line. In this case, guide pin (10a) is within the bending part (II) of groove (8b). When grooves (8a) and (8b) are at their longest focal length positions indicated in the broken line, the relative positions of guide pins (9a) and (10a) are the same as those shown in FIG. 6c. As is obvious in connection with Table 2, the displacement $\Delta x$ in the longest focal length position will be zero. However, the speed of the guide pin (10a) when it moves from the above position to the shortest focal length position, indicated in the chain line, is slower than that of the guide pin (9a) with respect to a rotatory direction around the optical axis. Therefore, the position of the guide pin (10a) relative to that of guide pin (9a) in the direction of the optical axis is different from the case in FIG. 6-c. As the above difference in the relative position of pin (10a) is set to be equal to displacement $\Delta x$ shown in Table 2, normal zooming photography is performed in the case of FIG. 6-b. In other words, the movement of the compensator lens group during normal zooming is determined by the sum of the shape of cam slot (7b'') and that of the bending part (II), and is designed in accordance with the setting of the shape of the bending part (II). As apparent from the above embodiment, the present invention is practiced by means of cam slot (7b'') of a conventional shape as in normal zoom lens system without utilizing a specific cam slot, such as (7b) and (7d) in FIG. 3 or (7b') in FIG. 5.

Figure 7A:
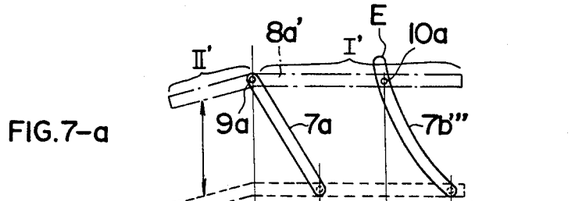

FIG. 7 shows a further modification of the embodiment shown in FIG. 6. In FIGS. 7-a and 7-b, cam slots and a groove are shown with zooming ring (8) and fixed barrel (7) unrolled. The parts corresponding to those of the FIG. 6 embodiment are again designated by the same reference numerals. The single groove (8a') of the zooming ring (8) engages with pins (9a) and (10a) which has a part (I') which is parallel with the optical axis and a bending part (II') off-set from the optical axis. Cam slot (7b''') of the fixed barrel has a shape to give movement to the compensator lens groups in case of normal zooming and further leads to an upper extension (E) as seen in FIG. 7-a. FIG. 7-a shows the case of normal zooming when zooming ring (8) is shifted to the left and guide pins (9a), (10a) are constantly within the part (I') of the groove (8a'). In this case, pin (10a) cannot be lead into extension (E) and the speed of pins (9a) and (10a) are equal to each other with respect to a rotatory direction around the optical axis.

Figure 7B:
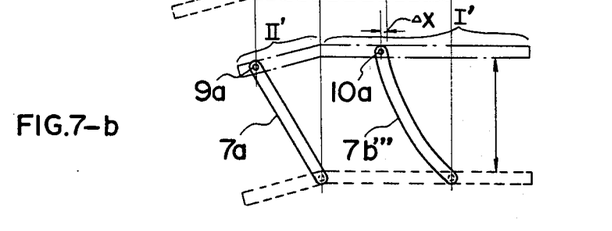

FIG. 7-b shows the case of constant magnification photography with zooming ring (8) shifted to the right. In this case, the rotary speed of guide pin (10a) compared to that of pin (9a) is faster than that in case of normal zooming. Thus, a displacement Δx is added to the movement of the compensator lens group to achieve the purposes of the present invention.

As can be readily appreciated, it is possible to deviate from the above embodiments of the present invention and will be readily understood by those skilled in the art that the invention is capable of many modifications and improvements within the scope and spirit thereof. Accordingly, it will be understood that the invention is not to be limited by the specific disclosed embodiment, but only by the scope and spirit of the appended claims.

What is claimed is:

1. A zoom lens system capable of constant magnification photography comprising:
    a variator lens group for varying the focal length of the lens system by the axial movement;
    a compensator lens group for controlling the position of an image formed by the system by axial movement thereof;
    first means for connecting the movement of the compensator lens group with that of the variator lens group in a first predetermined relationship so that the position of an image of a fixed object is maintained within a predetermined depth of focus during the variation of the focal length in a normal zooming mode of operation; and
    second means for connecting the movement of the compensator lens group with that of the variator lens group in a second predetermined relationship so that the position of an image of a moving object is maintained within a predetermined depth of focus in response to any variation of the focal length to offset any change in magnification due to a change in the photographing distance of the moving object to provide a constant magnification photography mode.

2. The invention of claim 1 further comprising means for focusing the system on the object in the normal zooming mode, the focusing means being independent from the first and second means.

3. The invention of claim 2 wherein the means for focusing comprises an axially movable focusing lens group located at the object side of the variator and compensator lens groups.

4. The invention of claim 1 wherein the first means comprises a first pair of cam and follower assemblies for controlling the movement of the variator and compensator lens groups, respectively, and the second means comprises a second pair of cam and follower assemblies for controlling the movement of the variator and compensator lens groups, respectively.

5. The invention of claim 4 wherein a first pair of cam and follower combinations are connected to a second pair so that the followers may be lead from the cams of the one pair into those of the other pair.

6. The invention of claim 1 wherein the first means comprises a pair of cam and follower assemblies for controlling the movement of the variator and compensator lens groups, respectively, one of the cams of the pair of cam and follower assemblies having a pair of opposite cam surfaces, the configurations of which differ from each other, and the first means further comprises means for biasing the follower to one of the opposite cam surfaces, and wherein the second means comprises means for biasing the follower to the other of the opposite cam surface.

7. The invention of claim 1 wherein the first means comprises a pair of cam and follower combinations for controlling the movement of the variator and compensator lens groups, respectively, and means for driving the followers of the pair along the cams in a first predetermined relationship, and wherein the second means comprises means for driving the followers of the pair along the cams in a second predetermined relationship.

8. A zoom lens system capable of predetermined constant magnification photography at various magnification rates comprising:
    a variator lens group for varying the focal length of the lens system by an axial movement along the optical axis;
    a compensator lens group for controlling the position of an image formed by the system by axial movement thereof;
    a focusing lens group capable of being set at various object distances to provide an in focus condition;
    means for setting the focus lens group at a predetermined object distance to provide a predetermined constant magnification ratio including control means for connecting the movement of the compensator lens group with that of the variator lens group in a second predetermined relationship so that the position of an image of a moving object is maintained within a predetermined depth of focus in response to any variation of the focal length to offset any change in magnification due to a change in the photographing distance of the moving object to provide a constant magnification photography mode.

* * * * *